Dec. 23, 1958  A. H. WAKEMAN  2,865,158
BOTTLE-FILLING APPARATUS
Filed May 7, 1956  10 Sheets-Sheet 2
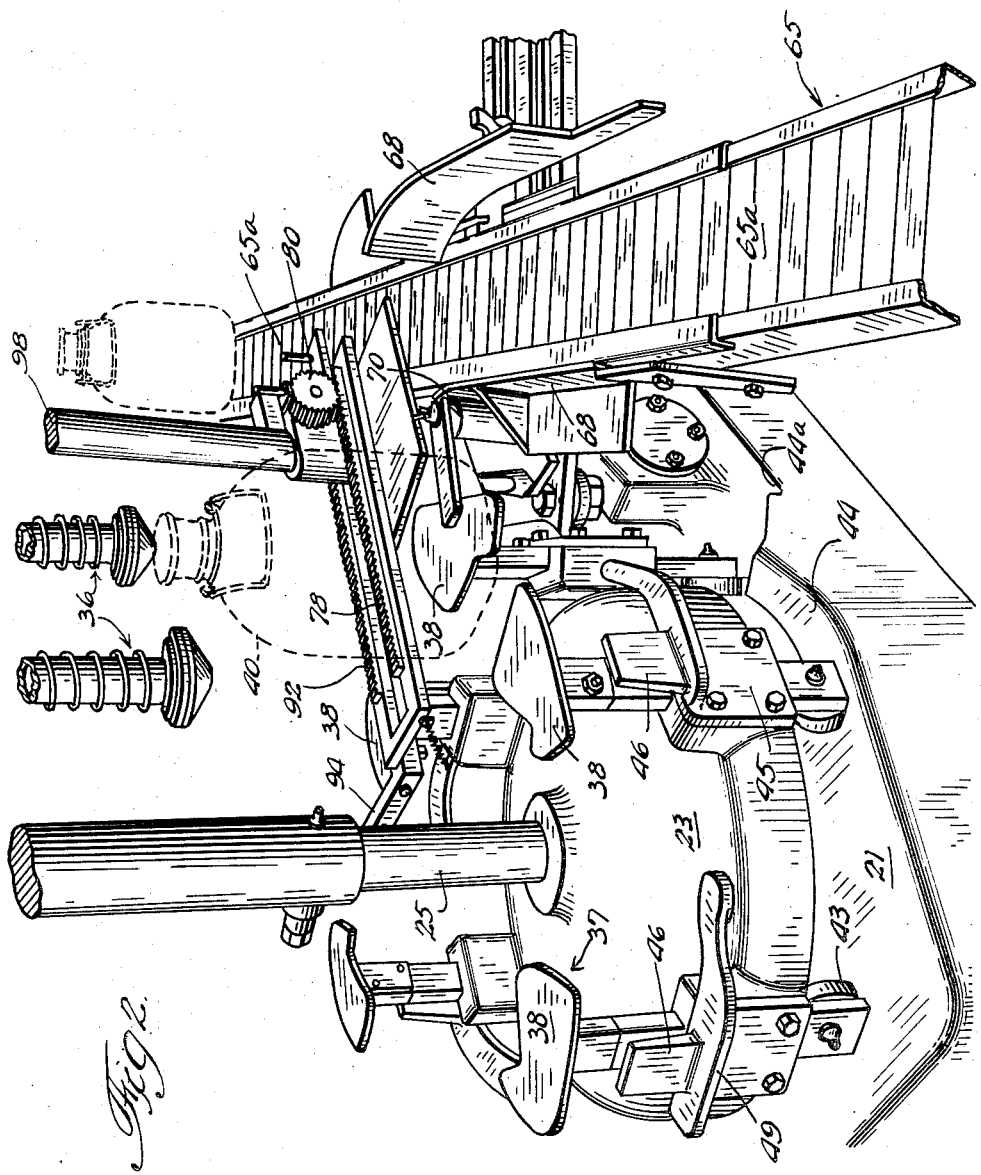
INVENTOR.
Alden H. Wakeman
BY
Thiess, Olsen, Mecklenburger,
von Holst, & Coltman

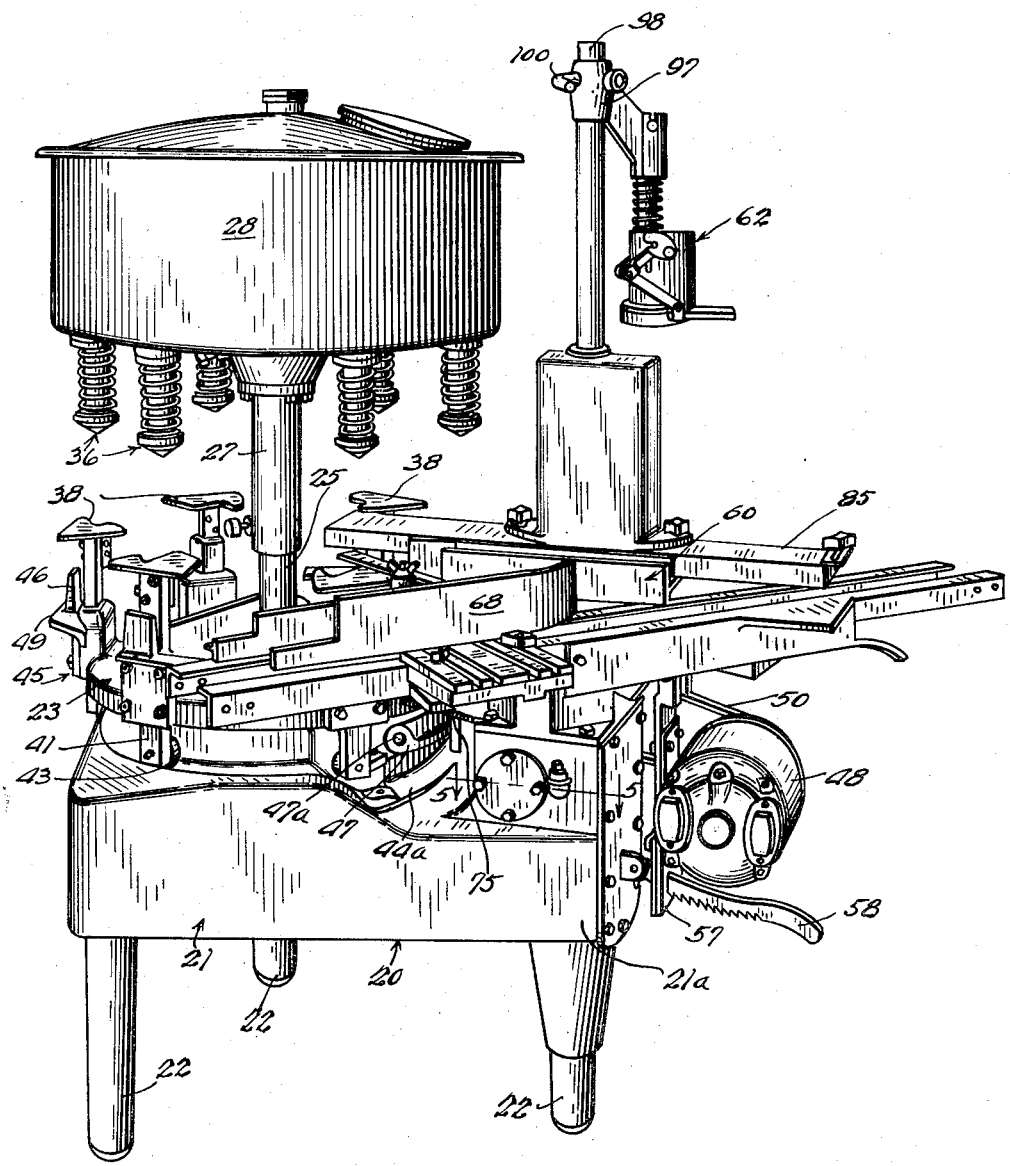

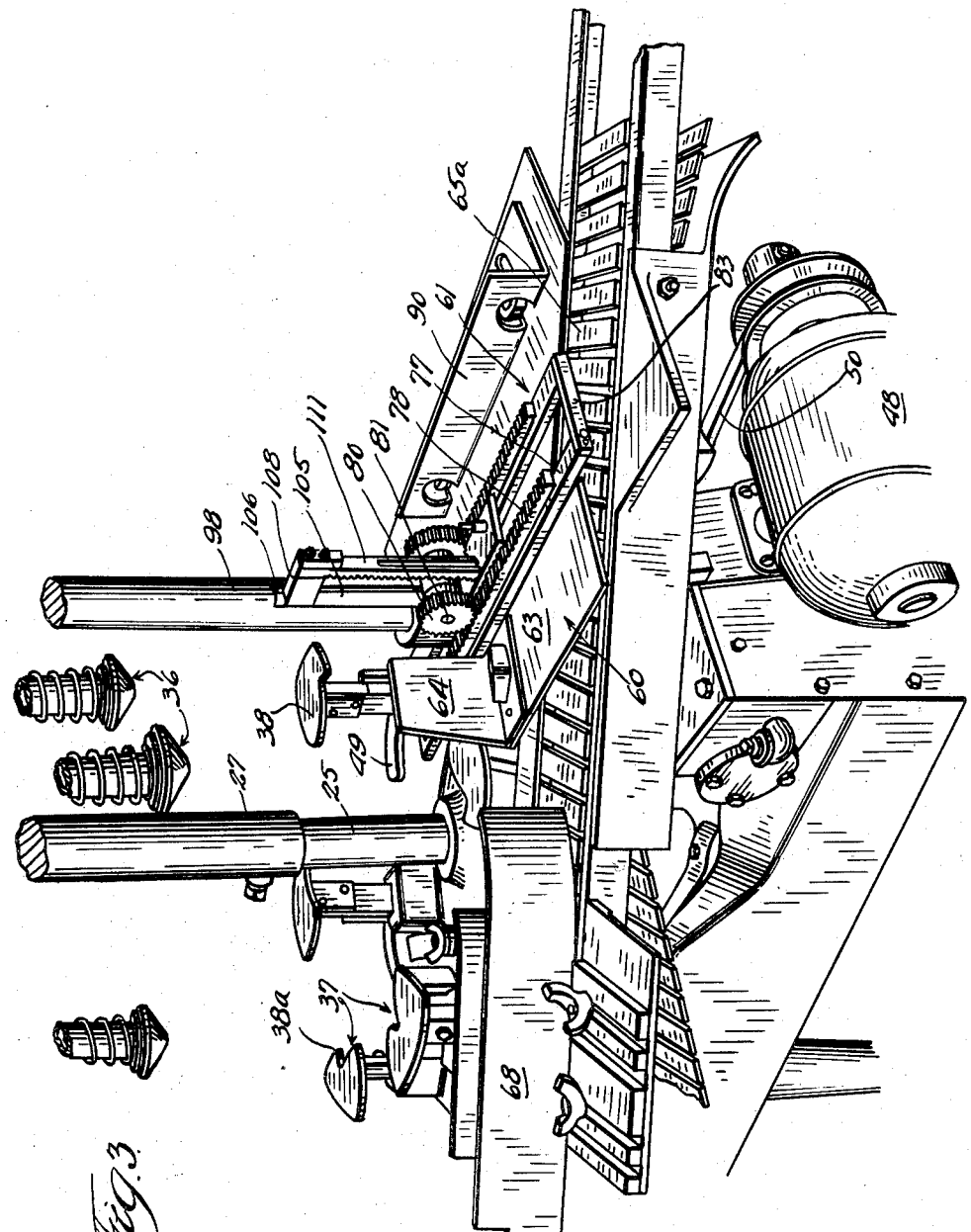

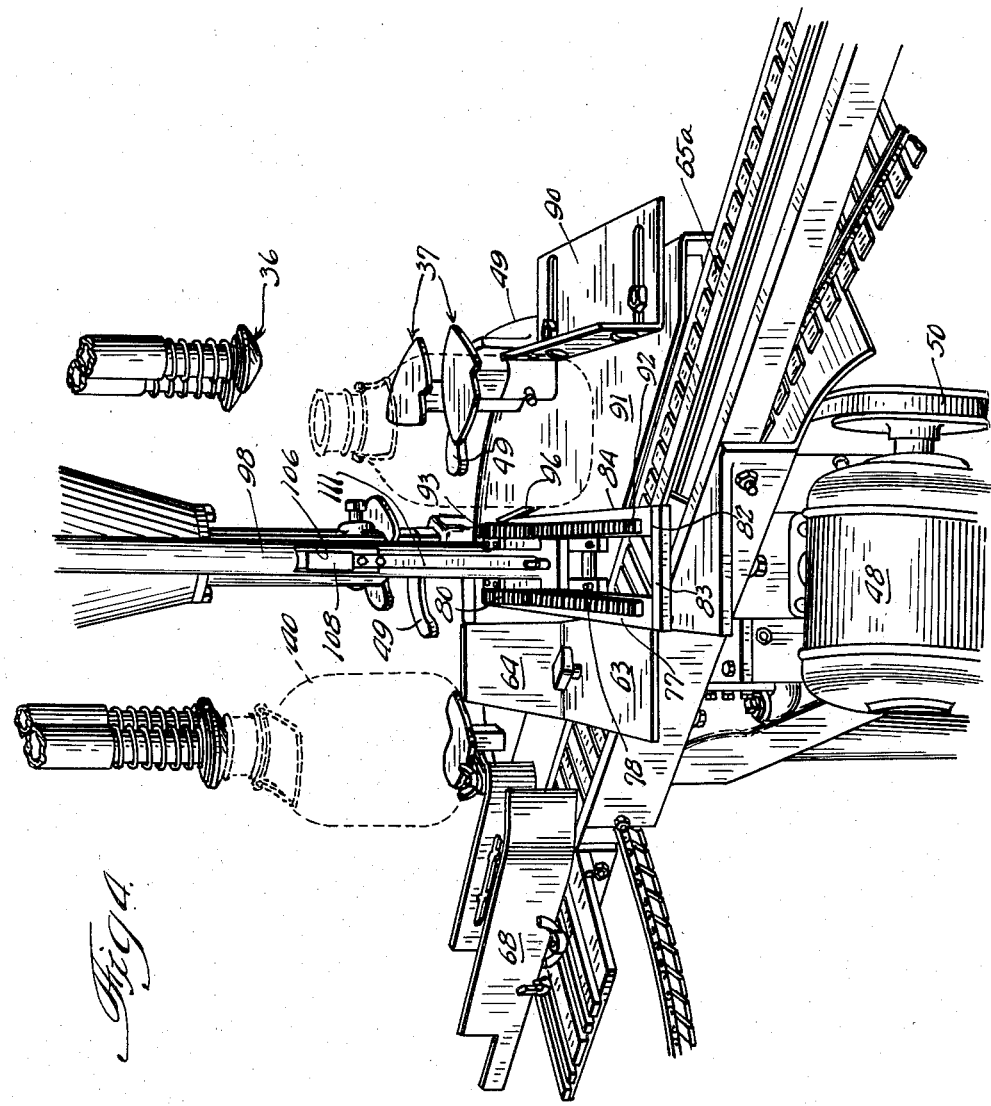

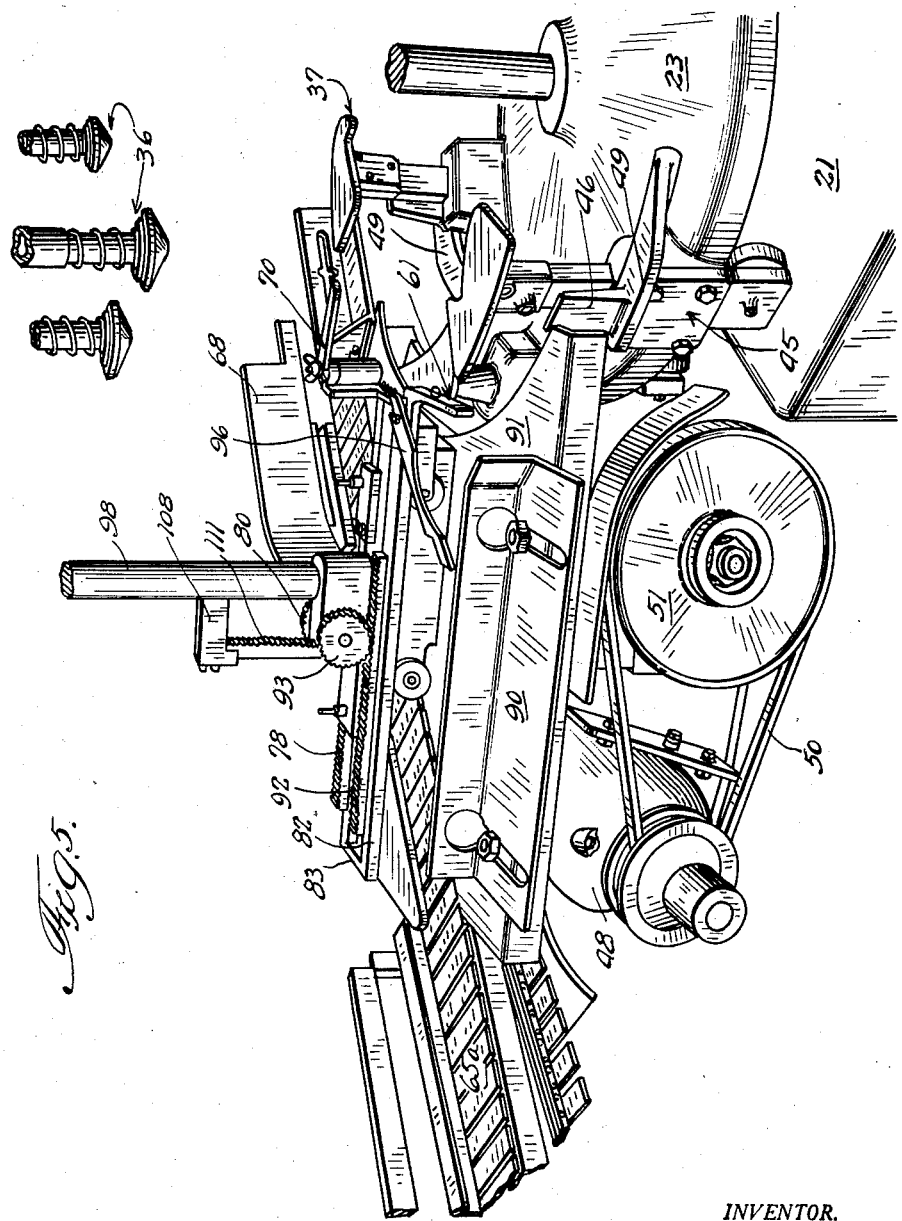

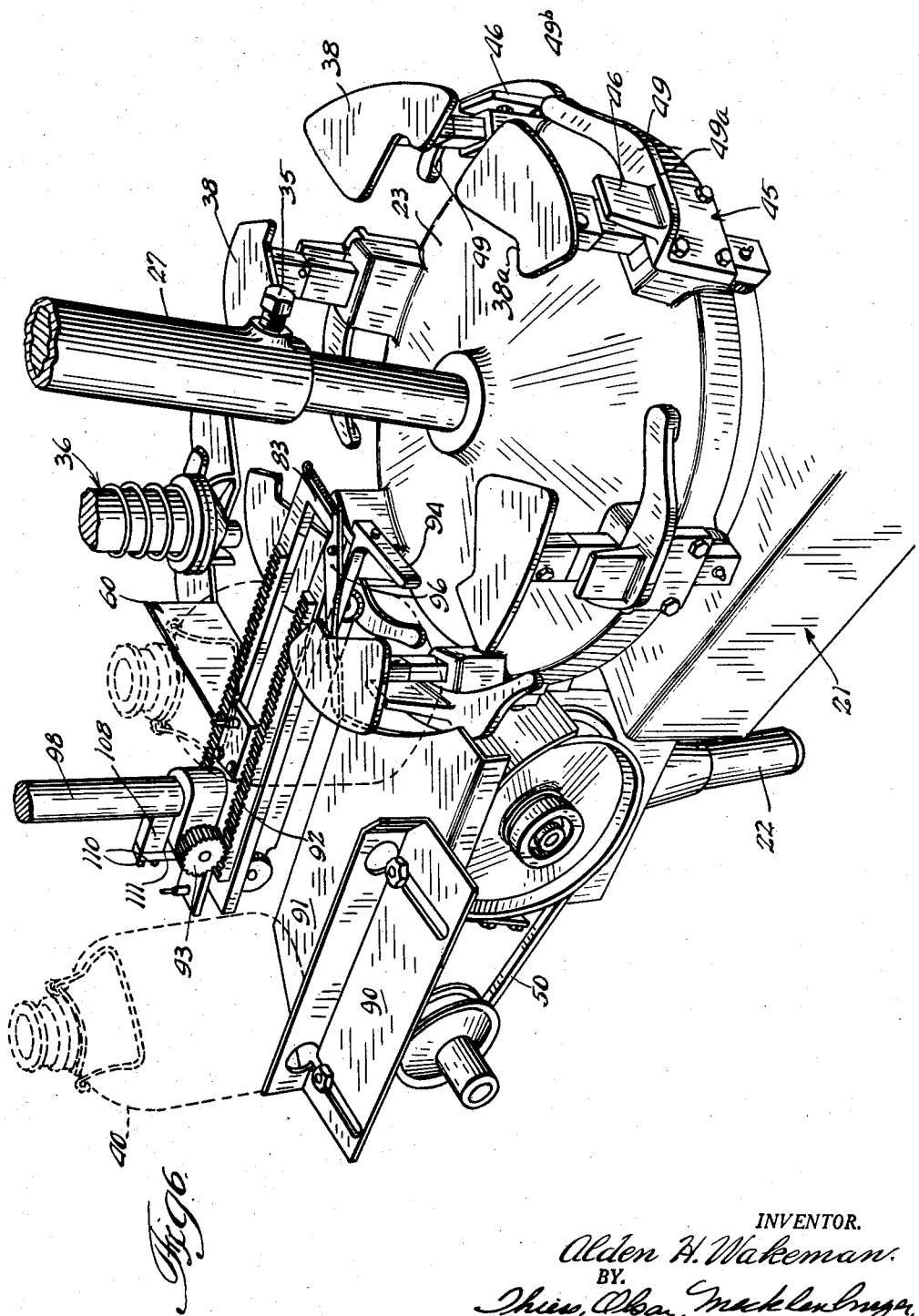

Dec. 23, 1958　　　　　A. H. WAKEMAN　　　　　2,865,158
BOTTLE-FILLING APPARATUS
Filed May 7, 1956　　　　　　　　　　　　　10 Sheets-Sheet 7
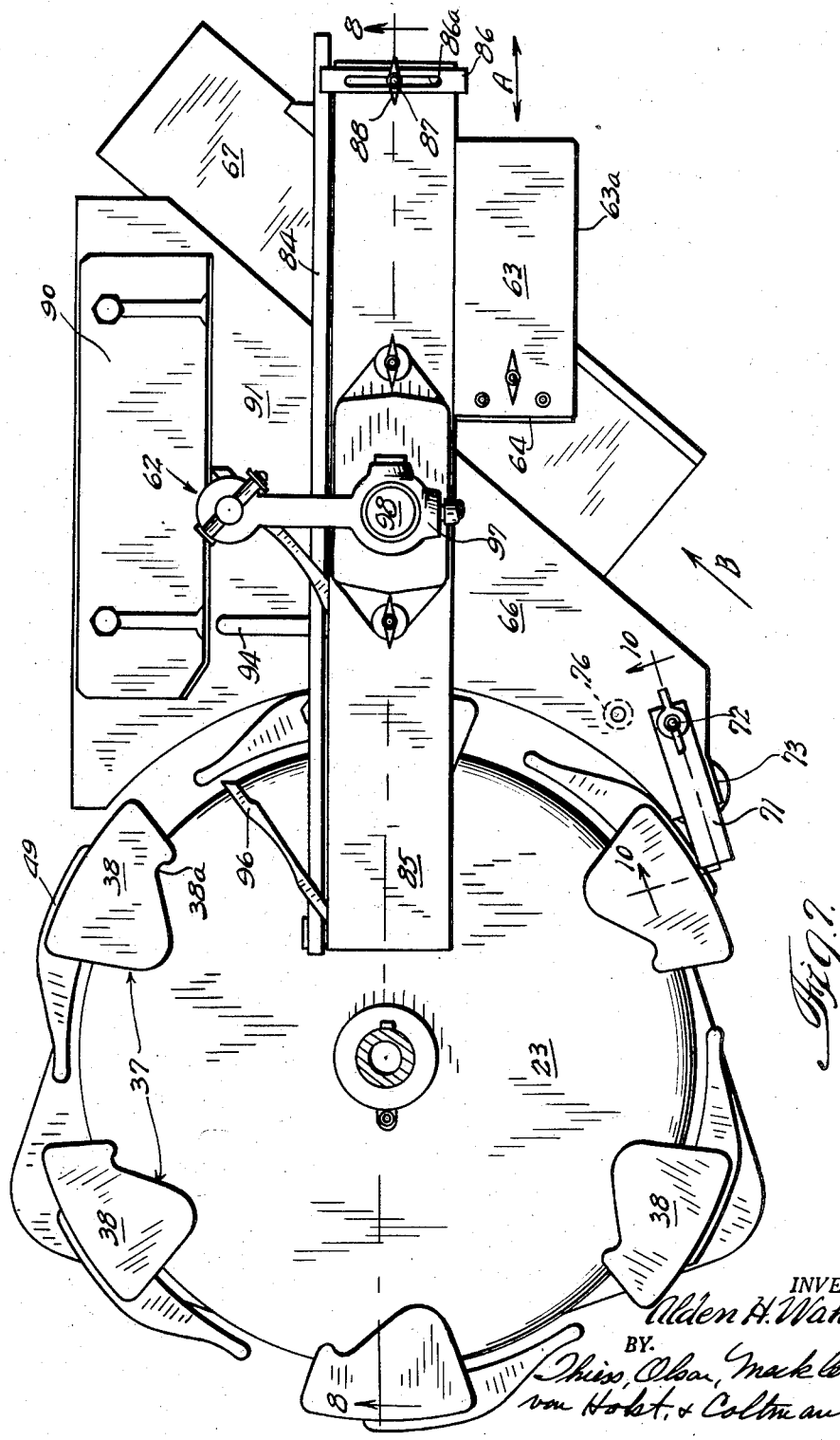
INVENTOR.
Alden H. Wakeman.
BY
Thiess, Olson, Mecklenburger,
von Holst, & Coltman and Pettis.

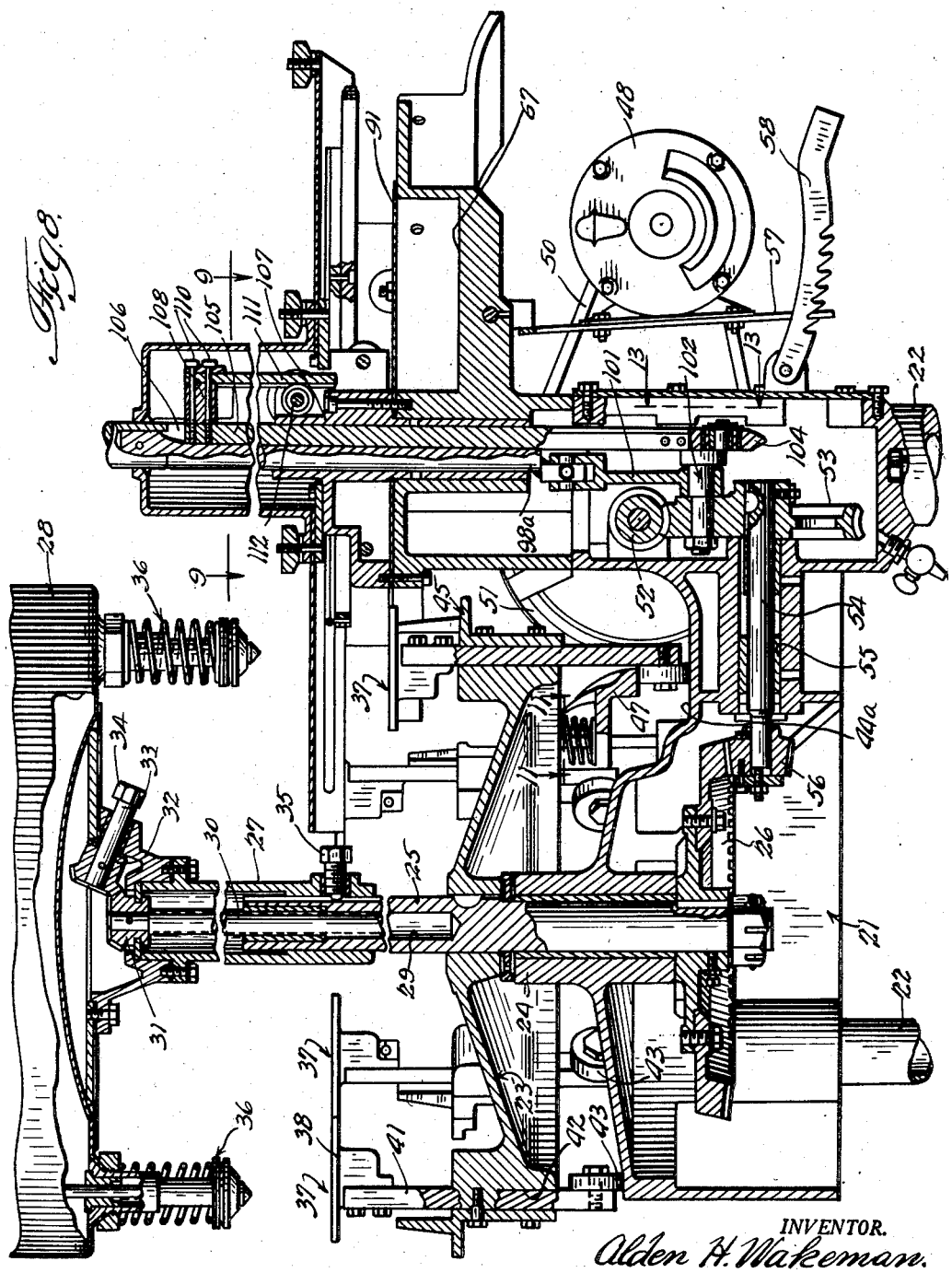

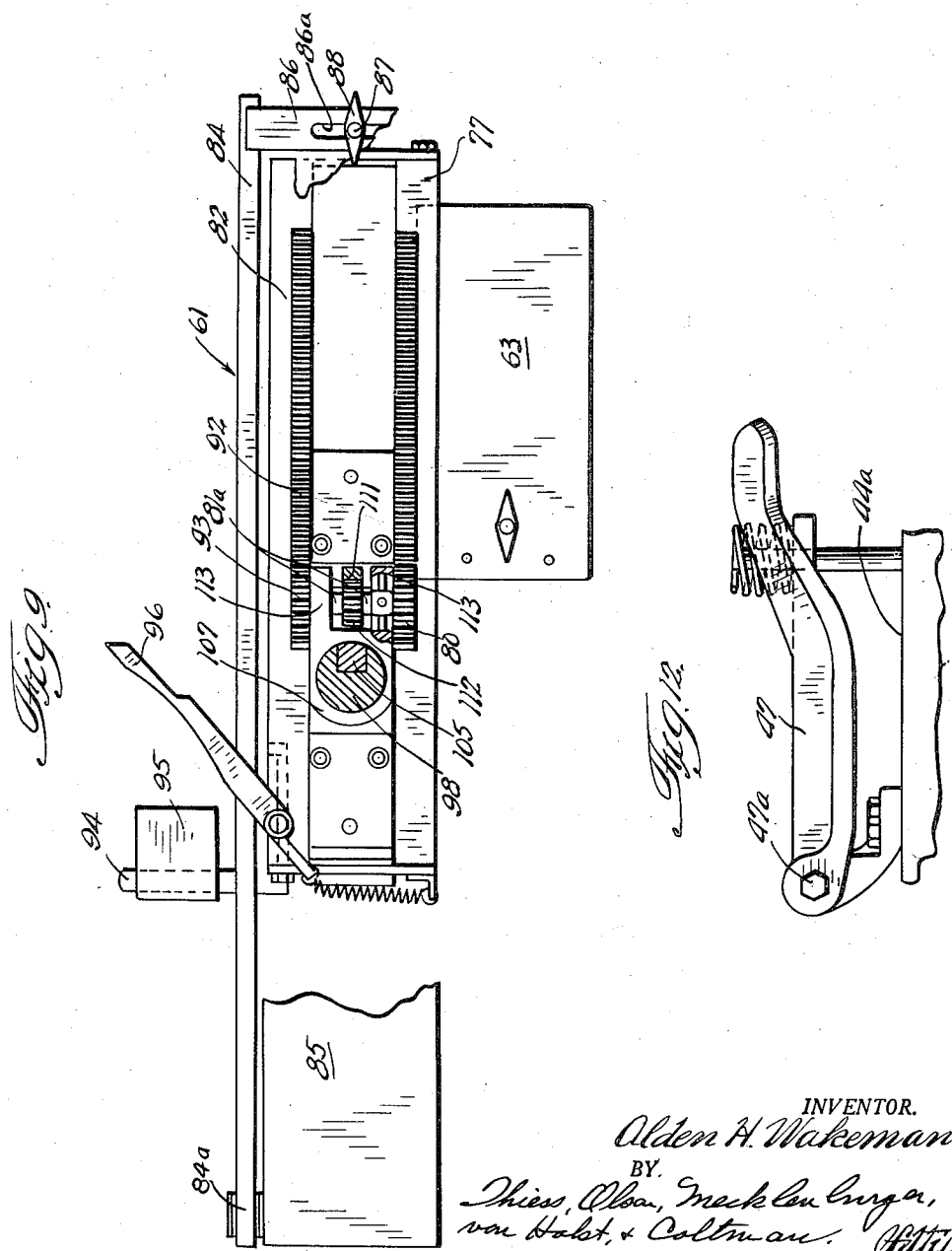

Dec. 23, 1958  A. H. WAKEMAN  2,865,158
BOTTLE-FILLING APPARATUS
Filed May 7, 1956
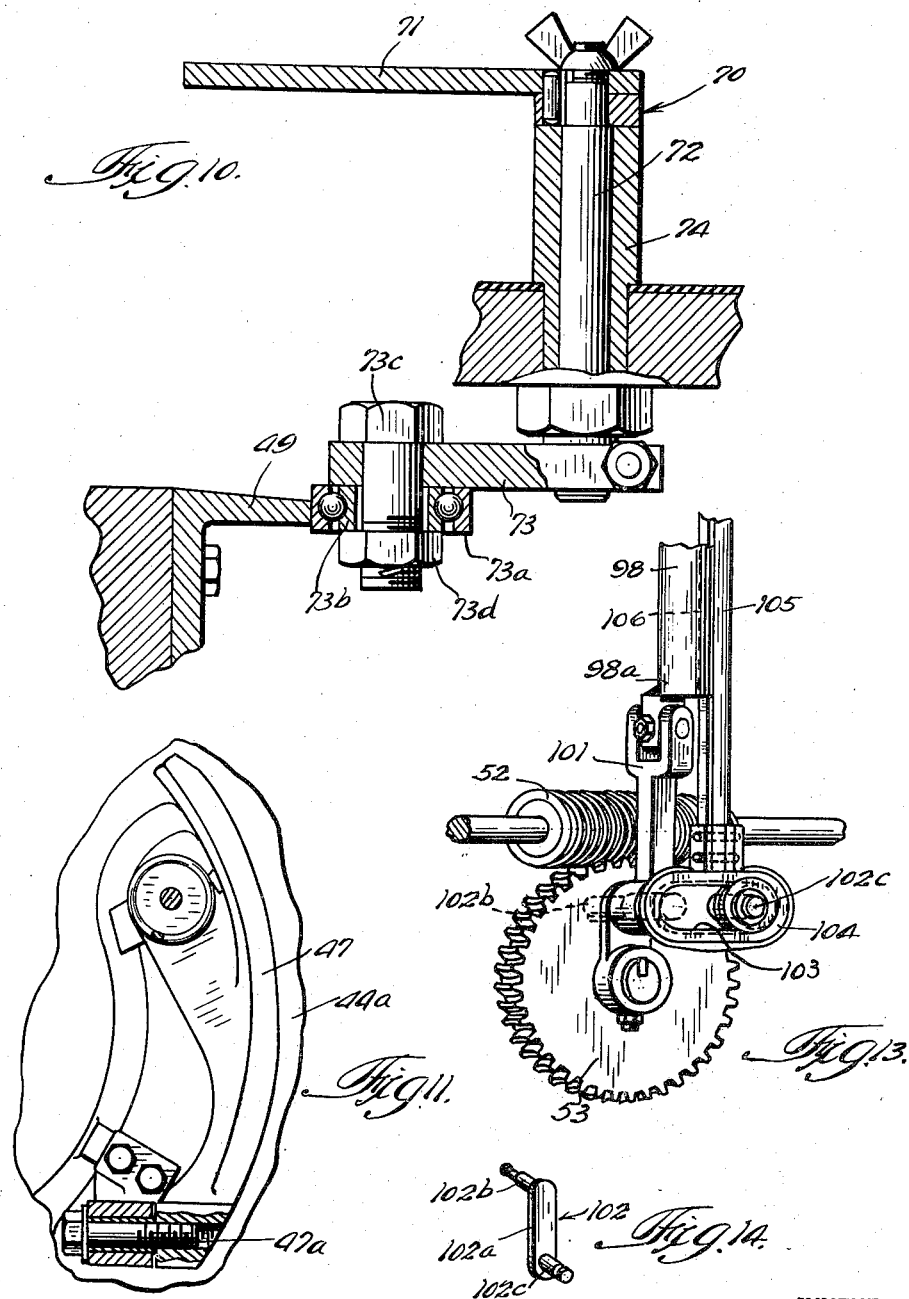
INVENTOR.
Alden H. Wakeman
BY
Thiess, Olsen, Mecklenburger,
van Holst & Coltman

United States Patent Office 2,865,158
Patented Dec. 23, 1958

2,865,158

BOTTLE-FILLING APPARATUS

Alden H. Wakeman, Lakemills, Wis., assignor to The Creamery Package Mfg. Company, Chicago, Ill., a corporation of Illinois Application May 7, 1956, Serial No. 583,110

13 Claims. (Cl. 53—281)

This invention relates to bottle-filling apparatus adapted for use in commercial establishments such as dairies, breweries, and the like.

Various apparatus of this type have heretofore been proposed which, however, because of their design, are possessed of one or more serious shortcomings such as, for example, the apparatus is: (a) bulky, complex, and costly in construction; (b) noisy in operation; (c) not readily capable of accommodating bottles varying over a wide range of sizes; (d) beset with the problems of maintenance and service and/or (e) causes excessive bottle breakage.

Thus, it is an object of this invention to satisfactorily overcome the aforementioned shortcomings associated with prior apparatus.

It is a further object of this invention to provide a bottle-filling apparatus which is simple in construction, effective in operation, and readily adapted for use, in combination with various other types of equipment utilized, in the processing of the liquid contained in the bottles.

Further and additional objects will appear from the description, accompanying drawings, and appended claims.

In accordance with one embodiment of this invention, a bottle-filling apparatus is provided, comprising an upright frame and a table mounted horizontally on said frame for rotation about a vertical axis. Arranged in symmetrically spaced relation on the table are a plurality of bottle-supporting pedestals, each of which is adapted for independent vertical movement with respect to said table upon rotation of the latter. Vertical adjustment of the pedestals is effected by cam means which is provided on the surface of said frame adjacent the underside of said table and is adapted to be engaged by the pedestals carried by the rotating table. Positioned on the frame and disposed horizontally and laterally with respect to one side of the table is a bottle-feed means which is adapted to reciprocate relative to said table to effect deposition of an empty bottle on a pedestal, subsequent to the latter being actuated by the rotating table to a predetermined first station. Mounted also on the frame and disposed horizontatlly and laterally with respect to one side of the rotating table is a bottle-sweeping means, which is adapted to effect removal of a liquid-filled bottle from a pedestal when the latter is disposed at a predetermined second station by the rotating table. The removed bottle is moved by the sweeping means to a position wherein the open end of the bottle is disposed in alignment with a bottle-capping means, which is mounted on a lateral extension of the frame and disposed sidewise of said rotating table for movement in a substantially vertical axis. The rotating table, bottle-feeding means, bottle-sweeping means, and bottle-capping means are all actuated in a predetermined time sequence by single power means carried by said frame.

For a more complete understanding of this invention, reference should be made to the drawings wherein:

Fig. 1 is a perspective view of the improved apparatus;

Figs. 2–6 are enlarged, fragmentary, perspective views of the improved apparatus taken at various angles, with respect to the bottle-feeding and bottle-sweeping means, and showing in dotted lines the bottles accommodated by the apparatus at various stations with respect to the rotating table;

Fig. 7 is a top plan view of the improved apparatus;

Fig. 8 is an enlarged sectional view taken along line 8—8 of Fig. 7;

Fig. 9 is a sectional view taken along line 9—9 of Fig. 8;

Fig. 10 is a sectional view taken along line 10—10 of Fig. 7;

Fig. 11 is a sectional view taken along line 11—11 of Fig. 8;

Fig. 12 is a side elevational view of Fig. 11;

Fig. 13 is a fragmentary perspective view taken substantially along line 13—13 of Fig. 8;

Fig. 14 is a perspective view of the crank pin shown in Fig. 13.

Referring now to the drawings and, more particularly to Fig. 1, an improved bottle or container-filling apparatus 20 is shown which is adapted for use in commercial dairies, breweries and the like. The apparatus, in this instance, includes a frame 21 supported in an upright position by a plurality of depending legs 22. Rotatably mounted on the upper side of the frame is a substantially annular table 23, which is adapted to rotate about a bearing 24 formed on frame 21 (see Fig. 8). Projecting vertically from bearing 24 is a spindle or shaft 25 which has the lower end thereof terminating beneath bearing 24 and accommodated by a gear 26, to which it is keyed. Encompassing the upper projecting end of spindle 25 is an elongated sleeve 27 to which is affixed a cylindrically shaped, liquid reservoir 28. Disposed within an axial bore 29, formed in the upper end of spindle 25, and protruding longitudinally there rcm is a shaft 30, to the upper end of which is affixed a bevel gear 31. Gear 31 is in meshing relation wi h a second bevel gear 32, which rotates about a shaft 33, the axis of which is obliquely disposed with respect to shaft 30 (see Fig. 8). Shaft 33 is manually r tated by me ns of an exposed knob 34, affixed the et , so as to fac litate rotational adjustment of reservoir 28, with respect to spindle 25, for a reason to be hereinafter discussed. Once the reservoir is positioned properly, with respect to spindle 25, it is held in fixed position, with respect thereto, by means of a locking-screw 35 extending through sleeve 27.

Reservoir 28 is of conventional design and has projecting downwardly, from the underside there f, a plurality of valves 36 which are arranged in spaced symmetrical relation with respect to the axis of rotation of spindle 25. The adjustment of the rese voir, by manipulation of knob 34, is to permit the plurality cf valves 36 to be vertically aligned with a plurality cf pedestals 37, correspondingly carried by table 23 about the perimeter thereof. Each pedestal 37 is movable in a vertical direction independently of table 23 in a manner to be hereinafter discussed. By reason of the fact that each pedestal is of the same construction, only one thereof will be discussed in detail hereinafter.

The pedestal 37 comprises a horizontally disposed platform 38, on which the base of the bottle or container 40 rests while being conveyed through a substantially circular path by the rotating table. Secured to the underside of platform 38, and projecting vertically downwardly therefrom, is an arm 41 which is adapted to slidably extend through a suitable opening 42 formed in the peripheral edge of table 23. The lower end of arm 41 terminates beneath the table 23 and has secured thereto a follower 43 which, in this instance, is a roller which frictionally engages the upper surface 44 of the frame 21, which surface functions as a cam for follower 43. Removably secured to the peripheral edge of the table 23 and cooperating therewith a form opening 42 is a retaining member 45 which is adapted to hold the pedestal 37 in assembled relation with respect to table 23. Member 45 has extending upwardly therefrom a lug 46 which serves as a stop to limit the downward movement of the platform 38 with respect to table 23. In addition, member 45, as seen in Fig. 6, is provided with a laterally projecting flange 49, the function of which will be discussed more fully hereinafter.

Disposed to one side of spindle 25 is a valley or depression 44a formed in the upper surface of the frame which, as will hereinafter be discussed, provides a cam for the follower 43. Secured to frame 21 and disposed in the vicinity of valley 44a is a spring-biased guide 47 which is adapted to pivot about a substantially horizontal axis 47a. Guide 47 is adapted to contact the follower 43 of each pedestal 37 as the follower commences downward movement into valley 44a and cause the underside of the platform 38 to contact lug 46 whereby the upper surface of the platform will be in coplanar relation with the surface of the frame on which the bottle is resting prior to being deposited on the pedestal or after the bottle has been removed from the pedestal.

The table and reservoir, heretofore described, are power actuated as a unit by a motor 48 carried on the underside of the frame. As seen in Fig. 8, the motor 48, in combination with a belt 50, a cooperating pulley 51, a worm gear 52 keyed to the shaft of the pulley 51, a spur gear 53 rotatably supported within a bore 55 formed in frame 21 and meshing with gear 52, a shaft 54 to which gear 53 is keyed to one end, a bevel gear 56 keyed to the opposite end thereof and an enlarged ring gear 26 which is affixed to the lower end of spindle 25 and in meshing relation with gear 56, produces the necessary rotation for the table and reservoir at the desired speed.

The motor 48 is affixed to a plate 57 which, in turn, is hingedly secured, along its upper edge, to a protruding portion 21a of the frame disposed to one side of the axis of rotation of table 23. To retain plate 57 in various positions of hinged adjustment, an arm 58, having a serrated underside, is pivotally connected at one end to frame portion 21a, beneath the hinge axis thereof, and the remainder of the arm extends through an opening former adjacent the lower edge of plate 57 so as to retain the plate at any desired position of adjustment and thereby vary the tension of the pulley belt 50.

Positioned on the upper side of frame portion 21a are the bottle-feeding means 60, the bottle sweeping means 61, and the bottle-capping means 62, all of which, as will be hereinafter discussed, are driven through a series of gear trains by motor 48.

The bottle-feeding means 60, as seen in Figs. 2, 3, and 7, comprises a pusher plate 63, which is adapted to reciprocate in a direction A (see Fig. 7), toward and away from the perimeter of rotating table 23. To the edge of plate 63, adjacent table 23, may be secured an adaptor 64 (see Fig. 3) which is adapted to accommodate and contact, more effectively, a bottle 40 as it is being conveyed by the pusher plate 63 from a line conveyor 65 to the platform 38 of one of the pedestals 37. The empty bottles are urged by the line conveyor 65 in a direction B (see Fig. 7) toward the reciprocating plate 63. Upon plate 63 reaching the terminus of movement, furthest removed from table 23, one of the empty bottles will be positioned in front of adaptor 64 by the movement of conveyor 65, whereby, upon movement of the plate 63 toward the table 23, the accommodated bottle will be moved over a horizontal surface 66 of the frame to a pedestal platform 38, disposed in coplanar relation therewith at a first station which is aligned with respect to the path of movement of plate 63, as shown in Fig. 2. The valley 44a of frame surface 44 is of such a depth, and lug 46 is of such a height, as to insure the coplanar relation between surface 66 and the platform 38 of a pedestal 37 when the latter is at the first station.

The pusher plate 63, as shown in Fig. 7, in this instance, is of substantially rectangular configuration, whereby one of the elongated sides 63a thereof is adapted to be in contact with the bottles disposed on conveyor 65, during movement of the plate 63 toward table 23. Thus, the elongated side 63a serves as a stop for the empty bottles being actuated by conveyor 65. While plate 63 is shown to be of rectangular configuration, it is to be understood that it is not limited to this particular shape.

Frame section 21a has included, as a part thereof, a substantially channel-shaped base portion 67 (see Fig. 7), which is adapted to accommodate the moving web 65a of the line conveyor 65. Secured to base portion 67 and extending upwardly therefrom are deflector sections 68 which, as seen in Fig. 2, are adapted to direct the bottles on conveyor 65 into a position in front of the adaptor 64, affixed to pusher plate 63, as the empty bottles are actuated by the conveyor toward the feed means 60.

Mounted upright on frame 21 and adjacent the aforementioned first station of the pedestals 37 is a spring-biased spotting finger assembly 70 which, as seen in Fig. 10, includes an elongated striker finger 71, keyed at one end to an upright shaft 72. To the lower end of shaft 72 is transversely affixed a second finger 73, which has the end thereof protruding into the path of movement of the pedestals 37, carried by table 23 and is adapted to be engaged by a laterally extending flange 49 formed on retaining member 45; the latter, as aforementioned, being affixed to the periphery of table 23. The shaft 72 is journalled in a sleeve 74 which is affixed to frame 21. Secured to the protruding end of finger 73 is a flange-engaged roller 73a, which is rotatably mounted on an eccentrical bushing 73b. The bushing encompasses a depending bolt 73c and is held in a fixed position against the underside of finger 73 by a nut 73d threaded to the distal end of the bolt 73c. The eccentricity of bushing 73b permits adjustment of the roller toward or away from the flange 49. This adjustment, however, is normally factory set at the time the apparatus is assembled. Upon the roller 73a of finger 73 being engaged by flange 49, the upper finger 71 is rotated in a counterclockwise direction, about shaft 72, to permit the bottle, deposited on the pedestal platform, positioned at the first station, to move undisturbed with the rotating table 23. The striker finger 71, shaft 72, and lower finger 73 are biased for movement, as a unit, in a clockwise direction about shaft 72, as an axis, by a suitable spring 75 (see Fig. 1) until the lower finger 73 strikes a depending lug 76 formed on the underside of frame surface 66 (see Fig. 7). The biasing spring 75 is of such tension that the finger 73 will readily return to its normal position, once a pedestal has passed, and thus form a pocket with the platform 38 of the next pedestal, when it reaches its first station, into which the bottle actuated by the feed means will be disposed. Once the bottle is disposed in the pocket, it will be properly aligned with a valve 36. Flange 49, as seen in Fig. 6, has the outer peripheral edge thereof of a unique configuration. The forward portion 49a of the peripheral edge, which is adapted to contact roller 73a, is of substantially uniform curvature so that finger 71 is cammed out of the path of the bottle, disposed on the pedestal, as the latter is moved from the first station. The trailing or rear portion 49b of the flange 49 tapers gradually inwardly so as to permit the finger 71 to return gradually to its normal position.

Pusher plate 63, as seen in Fig. 3, is secured to an elongated, horizontally disposed reciprocating bar 77, on the upper side of which is mounted an elongated rack gear 78. Meshing with rack gear 78 is a pinion gear 80, which is keyed to a horizontally disposed shaft 81, the latter being arranged transverse with respect to rack gear 78. The means for effecting rotation of pinion gear 80 will be discussed more fully hereinafter.

The bottle-sweeping means 61, as seen more clearly in Figs. 5, 6, 7, and 9, comprises an elongated bar 82, which is of the same configuration as bar 77, heretofore described, and is arranged in spaced substantially parallel relation therewith. Bars 77 and 82 are interconnected at their corresponding ends by end cross segments 83, which may be made integral with or removable from the bar ends. Disposed, in spaced relation, to one side of bar 82 is an elongated adaptor bar 84, which is pivotally secured at its inner end 84a to the end portion of a housing 85; the latter, when in assembled relation, being adapted to conceal the bars 77 and 82 and the associated parts therefor. The other end of bar 84 has a slotted piece 86 secured transversely thereto. The slot 86a in piece 86 is adapted to accommodate an upwardly extending pin 87, affixed to the housing 85. Threaded to the upper protruding end of pin 87 is a wing nut 88, which when drawn up tight on the pin, clamps the piece 86 against housing 85 and locks adaptor bar 84 in an adjusted position.

Spaced from bar 84 and disposed in substantially parallel relation therewith is guide plate 90, which is adjustably secured to a flat surface 91 formed on the frame portion 21a and over which the filled container is caused to move upon being removed by the sweeping means 61 from a pedestal 37 disposed at a second station of rotational adjustment, wherein the pedestal platform 38 is aligned with the path formed between adaptor bar 84 and guide plate 90. The pedestal platform, when the pedestal is at the second station, is in coplanar relation with surface 91, thereby facilitating removal of the bottle. The adaptor bar 84 and guide plate 90 are adjustable relative to one another, so as to guide a variety of bottles, varying widely in size and shape, into proper position on surface 91 with respect to the capping means 62.

Bar 82 of sweeping means 61 has the upper surface thereof provided with an elongated rack gear 92, which is adapted to be in meshing engagement with a pinion gear 93, the latter being keyed to shaft 81 on which pinion gear 80 of the feeding means is also keyed.

Mounted on the inner end portion of bar 82 and projecting laterally therefrom into the path formed on surface 91 by adaptor bar 84 and guide plate 90, is an elongated sweeper finger 94, which is adapted to engage the back side of a filled container 40, mounted on a pedestal located at the second station, and cause the latter to be slidably removed therefrom. As seen in Fig. 9, an adaptor pad 95 is removably mounted on the distal end of finger 94. The pad 95 is used when small size bottles are being filled by the apparatus. The size of pad 95 is such that the sweeping means will properly locate a small container, for example, a one-quart size as compared to a gallon size, with respect to the capping means. To compensate for the size of pad 95 and to prevent interference with the movement of the pedestal platform 38 as it is being lowered into coplanar relation with respect to surface 91, one side of each pedestal platform 38 is provided with a cut-out portion 38a (see Fig. 6).

As heretofore mentioned, finger 94, with or without pad 95 affixed thereto, is adapted to reciprocate in a horizontal plane spaced above surface 91. The sequence of operation of finger 94, with respect to the rotation of table 23, is such that finger 94 is moved to its innermost terminal position, that is, the position adjacent the axis of rotation of table 23—when the space between adjacent pedestals 37 is aligned with the path of movement of finger 94 and the pedestal approaching the second station has not moved in a downward direction due to depressed frame surface portion 44a. Before finger 94 has reversed its direction of movement, the approaching pedestal will have reached its second station, whereupon the finger 94 will contact the container positioned on the pedestal and move the same across surface 91.

Pivotally mounted on the inner end of bar 82 is a spring-biased pusher finger 96 (see Figs. 6 and 9) which is operative only when the last container has been removed from a pedestal and disposed beneath the capping means 62. Pusher finger 96 is adapted to move the last container from beneath the capping means 62 subsequent to the capping operation, and thereby prevent the last container from being subjected to repeated capping operations. During normal operation of the apparatus, the container, which is removed from the pedestal by the sweeping means 61, automatically engages the preceding container, which is in registration with the capping means and moves the same into the adjacent line conveyor portion (see Fig. 4); whereupon the capped container is directed to a loading station, not shown. Thus, where the containers are fed in continuous succession through the apparatus, the pusher finger 96 is deflected in a clockwise direction (see Fig. 9) by the container carried by the pedestal, as the latter reaches the second station, and is thereby rendered inoperative. If desired, a modified form of pusher finger, not shown, may be utilized which will contact each capped container and cause the latter to be moved thereby out of capping position.

The capping means 62 is of conventional design well known by those in the art, and is secured by means of a bracket 97 to a vertically reciprocating shaft 98. The capping means is locked on shaft 98 by a locking screw 100, at a predetermined position above surface 91 (see Fig. 1) so as to properly cap a container of a given height.

The lower end 98a of shaft 98 (see Figs. 8 and 13) is pivotally connected to one end of a connecting rod 101. The other end of rod 101 encompasses and functions as a journal for a stub-like section 102b of a crank pin 102, which is mounted on and spaced radially from the axis of rotation of gear 53. Thus, the rotary motion of gear 53 is transformed into a vertical reciprocatory movement of shaft 98 by the combination of pin 102 and connecting rod 101. Crank pin 102, as seen in Fig. 14, has a center section 102a, and two end sections 102b and 102c which extend in opposite directions from opposite ends of center section 102a. Section 102b, as heretofore mentioned, is stub-like in form and is encompassed by connecting rod 101. Section 102c, on the other hand, is also stub-like in form, but is slidably disposed in an elongated transverse slot 103 formed in a scotch yoke 104 (see Fig. 13). The yoke 104 is affixed to the lower end of an elongated rod 105 which is slidably disposed in a longitudinal slot or keyway 106 formed in reciprocating shaft 98. Shaft 98 and rod 105 are maintained in assembled upright relation by a bearing bushing 107 which is mounted on frame portion 21a.

By reason of the relative disposition of yoke 104 and crank pin 102, the movement of rod 105 is not in phase relation with shaft 98 for a purpose to be more fully discussed hereinafter. Referring to Fig. 8, it will be noted that affixed to the upper end of rod 105 by means of a transversely extending spacer block 108 and a pair of elongated anchoring bolts 110 is an elongated rack gear 111, which is disposed in spaced substantially parallel relation with rod 105. Gear 111 is adapted to mesh with a worm gear 112, which is keyed to shaft 81, the latter being common to pinion gears 80 and 93, which are disposed on opposite sides of worm gear 112. The length of rack gear 111 is greater than twice the radial distance between the axis of stub-like section 102b of crank pin 102 and the axis of shaft 54 for gear 53.

The portions 81a of shaft 81 disposed intermediate gears 80, 112 and 93 are journalled by extensions 113, which form a part of the bushing 107. Thus, upon reciprocation of rod 105, worm gear 112 is rotated by rack gear 111 to impart rotation to pinion gears 80 and 93. The rotational motion of gears 80 and 93 is transformed into reciprocating linear motion through rack gears 78 and 92 respectively, the latter forming parts of the bottle feed means and bottle sweeping means, previously discussed. The reciprocation of rod 105 lags somewhat the reciprocation of shaft 98 on which the bottle capping mechanism is mounted.

The reason for the lagging movement of rod 105 which, as heretofore indicated, actuates the bottle feed and sweeping means, is to insure that the bottle capping mechanism is clear of the upper end of the container prior to the latter being moved onto the line conveyor portion 65.

Summarizing briefly the operation of the apparatus, the empty container 40 is urged by line conveyor 65 into position in front of pusher plate 63 upon the latter being disposed at its outermost position with respect to table 23. As pusher plate 63 reverses its direction of movement, the empty container 40 is spotted on the platform 38 of the pedestal positioned at the first station. Upon the pedestal leaving the first station as the table rotates in a clockwise direction, the pedestal is cammed in an upward direction by the cam surface 44 of the frame 23, whereupon the open end of the container, supported by the pedestal, contacts the distal end of the valve 36 depending from reservoir 28 and causes the fluid stored in the reservoir to automatically flow into the container. Upon the container being completely filled, the depending valve 36 automatically shuts off; this occurs prior to the pedestal, supporting the container, starting its descent into the recessed portion 44a formed in frame surface 44. As the pedestal starts its descent, sweeper finger 94 has almost reached its terminal position, disposed closest to the axis of rotation of table 23, whereupon the finger 94 will be at such terminal position when the pedestal reaches the second station. Simultaneously with the pedestal reaching the second station, finger 94 commences its outward movement and sweeps the filled container off the pedestal into registered relation with the capping mechanism 62, whereupon shaft 98, to which the mechanism is secured, moves downwardly and causes the cap to be automatically placed on the open end of the container.

The relative movement of the various parts of the apparatus is such that one pedestal is disposed at the first station to receive an empty bottle, while another pedestal is approaching the second station. Thus, the bottle feed means 60 has completed its container-depositing operation prior to the bottle-sweeping means 61 commencing its sweeping operation. Suitable control switches for starting and stopping the apparatus have not been shown but, of course, are intended to be included on the apparatus at a readily accessible location.

Various parts of the apparatus may be readily adjusted so as to properly accommodate containers of various sizes and shapes.

Thus, it will be seen that a bottle or container filling apparatus has been provided which is compact and relatively simple in construction, quiet in operation, easily serviced and maintained, and eliminates, or materially reduces, bottle or container breakage. The term "bottle" is intended to cover glass, plastics, metal, wooden, or paper-carton containers.

While a particular embodiment of this invention is shown above, it will be understood, of course, that the invention is not to be limited thereto, since many modifications may be made and it is contemplated, therefore, by the appended claims, to cover any such modifications as fall within the true spirit and scope of this invention.

I claim:

1. A bottle-filling apparatus comprising a frame, a table mounted on said frame and rotatable about a vertical axis, a liquid reservoir mounted in spaced relation above said table for simultaneous rotation therewith about said vertical axis, a plurality of relatively spaced liquid-dispensing valves depending from said reservoir and arranged symmetrically about the axis of rotation of said table, a plurality of vertically adjustable pedestals carried by said table and in registered relation with said valves, cam means mounted on said frame beneath said table and engaged by said pedestals to effect predetermined vertical adjustment of the latter upon rotation of said table, bottle feed means disposed sidewise of said table and operable in a substantially horizontal plane to effect disposition of an empty bottle on a pedestal, when the latter is disposed at a predetermined station of rotational adjustment, bottle-sweeping means spaced from said feed means and operable in a substantially horizontal plane to effect removal of a liquid-filled bottle from a pedestal, when the latter is disposed at a second predetermined station of rotational adjustment, bottle-capping means mounted sidewise of said table for reciprocatory movement in a substantially vertical axis, said capping means being disposed adjacent the path of movement of said sweeping means and co-operating with said sweeping means to effect capping of the filled bottle removed by said sweeping means from the pedestal at said second station, and power means mounted on said frame and operatively connected to said table, feed means, sweeping means, and capping means to effect actuation of the same in a predetermined timed relation.

2. A bottle-filling apparatus comprising a frame, a horizontally disposed table mounted on said frame and rotatable in one direction about a vertical axis, a liquid reservoir mounted in spaced relation above said table for simultaneous rotation therewith about said vertical axis, a plurality of relatively spaced liquid dispensing valves depending from said reservoir and arranged symmetrically about the axis of rotation of said table, said valves being automatically actuated to an open position when contacted by the open end of a bottle, a plurality of relatively spaced bottle-supporting pedestals carried by said table and vertically adjustable with respect thereto, said pedestals being in vertical alignment with said valves, relatively fixed cam means mounted on said frame and engaged by said pedestals to effect vertical adjustment of the latter at predetermined stations of rotational adjustment of said table, bottle feed means disposed sidewise of said table and mounted on said frame for reciprocatory movement in a substantially horizontal plane toward and away from said table to effect disposition of an empty bottle on a pedestal when the latter is disposed at a first predetermined station of rotational adjustment, bottle-sweeping means disposed sidewise of said table and mounted on said frame for reciprocatory movement in a substantially horizontal plane, said sweeping means being spaced from said feed means and effecting removal of a liquid-filled bottle from a pedestal, when the latter is disposed at a second predetermined station of rotational adjustment, bottle-capping means mounted on said frame sidewise of said rotating table adjacent the path of movement of said sweeping means, said capping means being mounted for reciprocatory movement in a vertical direction to effect capping of the liquid-filled bottle removed by said sweeping means from the pedestal disposed at said second station, and power means mounted on said frame to effect rotation of said table and reciprocation of said feed, sweeping, and capping means in a predetermined timed relation.

3. An appparatus for use with a table rotatable about a vertical axis and provided with a plurality of vertically adjustable bottle pedestals arranged in symmetrical relation about the periphery of said table, said apparatus comprising a bottle feed means mounted for linear reciprocatory movement in a substantially horizontal plane, said means, when actuated in one relative direction, effecting disposition of an empty bottle on a pedestal when the latter is disposed at a first station of rotational adjustment, a bottle-sweeping means mounted in spaced relation with respect to said feed means for linear reciprocatory movement in a substantially horizontal plane, said sweeping means, when actuated in one relative direction, effecting removal of a filled bottle from a pedestal when the latter is disposed at the second station of rotational adjustment, bottle-capping means mounted intermediate said feed and sweeping means for reciprocatory linear movement along a vertical axis, said capping means, when actuated in one relative direction, effecting capping of the filled bottle removed by said sweeping means from the pedestal at the second station, and gear means disposed normal to the direction of movement of said capping means and actuated thereby into rotation, said gear means being also disposed normal to the direction of movement of said feed and sweeping means and contacting same to actuate the latter upon actuation of said gear means by said capping means.

4. An apparatus for feeding an empty bottle onto and subsequently removing the bottle from the rotating table of a bottle filler and then capping the removed bottle in accordance with a predetermined time sequence; said apparatus comprising a bottle feed means mounted for linear reciprocatory movement in a substantially horizontal plane to effect, when actuated in one relative direction, disposition of an empty bottle onto the table, an elongated gear means carried by said feed means and having the longitudinal dimension thereof disposed parallel to the direction of movement of said feed means, a bottle-sweeping means mounted for linear reciprocatory movement in a substantially horizontal plane to effect, when actuated in one relative direction, removal of a filled bottle from the table, an elongated gear means carried by said sweeping means and having the longitudinal dimension thereof disposed parallel to the direction of movement of said sweeping means, a rotary gear element in meshing relation with both of said elongated gear means, and power-actuated capping means mounted for linear reciprocatory movement in a vertical plane adjacent the path of movement of said sweeping means to effect capping of a filled bottle removed by said sweeping means from the table; said capping means carrying a geared portion in meshing relation with said gear element and imparting rotation thereto upon reciprocation of said capping means.

5. A bottle-filling apparatus comprising a frame, a table mounted on said frame and rotatable about a vertical axis, a plurality of bottle-supporting pedestals mounted on said table and arranged in spaced symmetrical relation with respect to the axis of rotation of said table, bottle feed means mounted on said frame and to one side of said table for substantially linear reciprocatory movement in a substantially horizontal plane, said means, when actuated in one relative direction, effecting disposition of an empty bottle on a pedestal, when the latter is disposed by said rotating table at a predetermined first station, bottle-sweeping means mounted on said frame and disposed sidewise of said table for substantially linear reciprocatory movement in a substantially horizontal plane, said sweeping means, when actuated in one relative direction, effecting removal of a bottle from a pedestal subsequent to the latter being disposed by said rotating table at a predetermined second station, said sweeping means depositing the removed bottle at a third station spaced outwardly from said table, and bottle-capping means mounted on said frame adjacent the path of movement of said sweeping means for reciprocatory movement along a substantially vertical axis, said capping means, when actuated in one relative direction, effecting capping of a bottle disposed at said third station.

6. A bottle-filling apparatus comprising a frame, a table mounted on said frame and rotatable about a vertical axis, a plurality of bottle-supporting pedestals mounted on said table and arranged in spaced symmetrical relation with respect to the axis of rotation of said table, bottle-feed means mounted on said frame and to one side of said table for reciprocatory movement in a substantially horizontal plane, said means, when actuated in one relative direction, effecting disposition of an empty bottle on a pedestal when the latter is disposed by said rotating table at a predetermined first station, bottle-sweeping means mounted on said frame and disposed sidewise of said table for reciprocatory movement in a substantially horizontal plane, said sweeping means, when actuated in one relative direction, effecting removal of a bottle from a pedestal subsequent to the latter being disposed by said rotating table at a predetermined second station, said sweeping means depositing the removed bottle at a third station spaced outwardly from said table, and bottle-capping means mounted on said frame adjacent the path of movement of said sweeping means for reciprocatory movement along a substantially vertical axis and, when actuated in one relative direction, effecting capping of a bottle disposed at said third station; said capping means including a section operatively connected to said sweeping means and actuating same, said section being mounted for independent reciprocatory movement along said vertical axis.

7. An apparatus comprising a horizontally disposed bottle-supporting pedestal mounted for movement in a predetermined direction, bottle-feeding means mounted in spaced relation with respect to said pedestal for reciprocatory movement in a substantially horizontal plane, the direction of movement of said means being angularly disposed with respect to the direction of movement of said pedestal to effect disposition of a bottle on said pedestal when the latter is at a predetermined station of movement and said means is at one terminal of its reciprocatory movement, and bottle-spotting means mounted adjacent said predetermined station of pedestal movement and co-operating with said feed means to effect disposition of a bottle centrally on the pedestal at said station, said spotting means including an elongated bottle-contacting member movable about a substantially vertical axis and through a predetermined sector, said member having a portion thereof projecting into the path of movement of said feed means and co-operating with a pedestal when the latter is at said station to form a pocket into which a bottle is fed by said bottle-feeding means, said member being actuated by said pedestal, upon movement thereof from said predetermined station, to effect movement of said member in one direction through a predetermined sector whereby said member is disposed outside of the path of movement of the bottle when the latter is supported by said pedestal.

8. The apparatus recited in claim 7 wherein the bottle-spotting means has the bottle-contacting member thereof biased to assume said pocket-forming position.

9. An apparatus comprising a horizontally disposed bottle-supporting pedestal mounted for movement in a predetermined direction in a first horizontal plane, said pedestal, upon approaching a predetermined station, descending to a second predetermined horizontal plane, and bottle-sweeping means mounted in spaced relation with respect to said pedestal for reciprocatory movement in a substantially horizontal plane disposed above the plane of said pedestal when the latter is at said predetermined station, the direction of movement of said means being angularly disposed with respect to the direction of movement of said pedestal to effect removal of a bottle supported by said pedestal when said pedestal is at said predetermined station; said means including an elongated bottle-contacting element disposed transversely with respect to the direction of travel of said means, said element traversing in one direction the path of movement of said pedestal prior to the latter reaching said predetermined station, and traversing said path of pedestal movement in the opposite direction subsequent to said pedestal reaching said predetermined station to effect removal of a bottle supported by said pedestal.

10. An apparatus comprising a horizontally disposed bottle-supporting pedestal mounted for movement in a predetermined direction, bottle-sweeping means mounted in spaced relation with respect to said pedestal for reciprocatory movement in a substantially horizontal plane, the direction of movement of said means being angularly disposed with respect to the direction of movement of said pedestal to effect removal of a bottle supported by said pedestal when the latter is at a predetermined station, said means having an elongated bottle-contacting element disposed transversely with respect to the direction of travel of said means, said element traversing in one direction the path of movement of said pedestal prior to the latter reaching said predetermined station and traversing said path of pedestal movement in the opposite direction across said pedestal subsequent to said pedestal reaching said predetermined station to effect removal of a bottle supported by said pedestal to a predetermined second station in the path of movement of said means, and bottle-capping means disposed adjacent said predetermined second station to effect capping of the bottle deposited by said sweeping means at said predetermined second station; said capping means being mounted for reciprocatory movement in a vertical direction.

11. A bottle-filling apparatus comprising a frame, horizontally disposed arcuate cam means mounted on said frame, a table mounted on said frame for interrupted rotation about a vertical axis, a liquid reservoir mounted in spaced relation above said table for simultaneous rotation therewith about said vertical axis, a plurality of relatively spaced liquid dispensing valves depending from said reservoir and arranged symmetrically about the axis of rotation of said table, a plurality of bottle-supporting pedestals carried by and rotatable with said table and being vertically adjustable with respect thereto, each pedestal being provided with a follower which is in contact with said cam means and effects vertical adjustment of said pedestal upon rotation of said table, bottle-feeding means disposed in spaced sidewise relation with respect to said table and being mounted for reciprocatory movement in a substantially horizontal plane to effect positioning a bottle on a pedestal when the latter is at predetermined first station, and bottle-sweeping means disposed sidewise of said table at a predetermined second station of pedestal travel, said sweeping means being mounted for reciprocatory movement in a horizontal plane to effect removal of a bottle supported by a pedestal when the latter is at said predetermined second station; the portion of said cam means intermediate said second and first pedestal station being depressed wherein the bottle-supporting surface of each pedestal upon moving from said predetermined second station to said predetermined first station, is spaced a greater distance from said liquid dispensing valves than when said pedestal is moving from said predetermined first station to said predetermined second station.

12. An apparatus comprising a horizontally disposed bottle-supporting pedestal mounted for movement in a predetermined direction in a horizontal plane past determined stations, bottle-feeding means mounted adjacent said pedestal, when the latter is at a predetermined first station of movement, for movement relative thereto in a substantially horizontal plane, the direction of movement of said bottle-feeding means being angularly disposed relative to the direction of movement of said pedestal to effect disposition of a bottle on said pedestal, when the latter is at said first station, and bottle-sweeping means mounted adjacent said pedestal when the latter is at a predetermined second staion of movement, for substantially linear reciprocatory movement in a substantially horizontal plane, the direction of movement of said bottle-sweeping means being angularly disposed with respect to the direction of movement of said pedestal to effect removal of a bottle from said pedestal when the latter is at said second station.

13. An apparatus comprising a horizontally disposed bottle-supporting pedestal mounted for movement in a predetermined direction in a horizontal plane past predetermined stations, bottle-feeding means mounted to one side of said pedestal for substantially linear reciprocatory movement in a substantially horizontal plane, the direction of movement of said bottle-feeding means being angularly disposed with respect to the direction of movement of said pedestal to effect disposition of a bottle on said pedestal when the latter is at a predetermined first station of movement, and bottle-sweeping means mounted to one side of said pedestal and spaced from said bottle-feeding means for substantially linear reciprocatory movement in a substantially horizontal plane, the direction of movement of said bottle-sweeping means being angularly disposed with respect to the direction of movement of said pedestal and substantially parallel to the direction of movement of said bottle-feeding means to effect removal of a bottle from said pedestal when the latter is at a predetermined second station of movement.

References Cited in the file of this patent

UNITED STATES PATENTS

| | | |
|---|---|---|
| 1,575,175 | Miller | Mar. 2, 1926 |
| 2,176,557 | Lippold | Oct. 17, 1939 |
| 2,570,956 | Kronquest | Oct. 9, 1951 |